United States Patent [19]
Hongu et al.

[11] Patent Number: 5,319,463
[45] Date of Patent: Jun. 7, 1994

[54] ARRANGEMENT AND METHOD OF PREPROCESSING BINARY PICTURE DATA PRIOR TO RUN-LENGTH ENCODING

[75] Inventors: Takahiro Hongu; Kazuhide Yamakawa, both of Tokyo, Japan

[73] Assignee: NEC Corporation, Japan

[21] Appl. No.: 853,995

[22] Filed: Mar. 19, 1992

[30] Foreign Application Priority Data

Mar. 19, 1991 [JP] Japan .................................. 3-054287

[51] Int. Cl.⁵ .......................................... H04N 1/419
[52] U.S. Cl. ................................ 358/261.1; 358/261.2; 358/426
[58] Field of Search ................... 358/261.1, 261.2, 426, 358/427, 429, 430, 433, 448, 455, 456, 462; 382/56

[56] References Cited

U.S. PATENT DOCUMENTS

| | | | |
|---|---|---|---|
| 4,115,815 | 9/1978 | Nakagome et al. | 358/430 |
| 4,860,114 | 8/1989 | Horikawa et al. | 358/261.2 |
| 4,918,540 | 4/1990 | Ohtani | 358/261.1 |

Primary Examiner—Mark R. Powell
Assistant Examiner—Thomas D. Lee
Attorney, Agent, or Firm—Laff, Whitesel, Conte & Saret

[57] ABSTRACT

An improved technique for pre-processing a picture image data signal wherein a black/white image data and a halftone image data coexists, is disclosed. The preprocessing is implemented before run-length encoding. Each of line image data signals is divided into n data blocks (n is a positive integer). A reset signal is produced in synchronism with each of the data blocks when divided. Following this, a selector is supplied with a first line image data signals directly applied and also receives the first line image data via a convolution circuit to said selector. The number of transition points in each of the data blocks is counted with respect to the first line image data signal which is directly applied to said selector. Similarly, the number of transition points in each of the blocks is carried out with the first line image data signal which is applied to said selector via said convolution circuit. The comparison results of n blocks of the first line image data are stored and then applied to the selector which chooses one of the data blocks of a second line image data signal applied thereto according to the comparison results. The second line image data signal is preceded by said first line image data signal.

5 Claims, 7 Drawing Sheets

ARRANGEMENT AND METHOD OF PREPROCESSING BINARY PICTURE DATA PRIOR TO RUN-LENGTH ENCODING

BACKGROUND OF THE INVENTION

1. Field of the Invention

The present invention relates to an arrangement and a method of preprocessing binary picture data before runlength encoding same, and more specifically to such an arrangement and method which features a high data compression efficiency in transmitting binary picture data of a document which includes both monotone and halftone picture images.

2. Description of the Prior Art

Run length coding, viz., the coding of lengths of consecutive black/white picture elements is well known in the art of facsimile transmission for the purpose of transmission redundancy reduction. This technique allows for the compression of binary picture data obtained by scanning a document including black/white images such as letters.

The Modified Huffman code and the two dimensional extension of the same, called the Modified READ code, are examples of international standards established for the purposes of increasing the utility of the above mentioned method.

However, even though the run length coding has found extensive use in redundancy reduction in two-level facsimile digital transmission, the same efficiency is not expected with the image processing of a halftone or multi-tone document such as a photograph. In order to overcome this problem, it has been proposed to generate a prediction error signal using a dithering technique. The prediction error signal is then processed by a convolution circuit which includes a shift register and an exclusive-OR gate. Thus, the number of transition points are effectively reduced.

However, another problem occurs in the event of processing a document which includes black/white and multi-tone images together. That is, according to a known technique, an operation should select one of the two-level and multi-tone transmission modes prior to transmission and, accordingly an operator is uncertain which mode should be selected in the case where the two-level and multi-tone images coexist in the same document to be transmitted.

In order to overcome the problem mentioned just above, another prior art has been disclosed in U.S. Pat. No. 4,918,540 assigned to the same entity as the assignee of the present invention. According to this prior art, the number of one line pixel transition points after being preprocessed (denoted by a first number), is compared with that which has not been preprocessed (denoted by a second number). If the above mentioned first number is smaller than the second number, the one line pixel data with the smaller number of transition points is transmitted. In this instance, a tag signal indicative of which line image data (viz., preprocessed or not preprocessed) is transmitted, should be attached to each line transmission.

However, the aforesaid known technique has encountered the problem in that if the two-level and multi-level images coexists in one line, a high compression efficiency is not expected. Another problem of this prior art is that the transmission time is undesirably increases due to the attachment of the tag signal to each line.

SUMMARY OF THE INVENTION

It is an object of the present invention to provide an arrangement which features a high transmission redundancy reduction with a document which includes black/white and multi-tone images.

Another object of the present invention is to provide a method which features a high transmission redundancy reduction with a document which includes black/white and multi-tone images.

More specifically a first aspect of the present invention comes in a method of pre-processing a picture image data signal before run-length encoding, the picture image data signal being obtained by line scanning a document and including black/white image data and halftone image data, comprising the steps of: (a) dividing each line image data signal obtained into n data blocks (n is a positive integer); (b) producing a reset signal in synchronism with each of the data blocks; (c) applying a first line image data signal to a selector and also applying the first line image data signal via a convolution circuit to said selector; (d) counting the number of transition points in each of the data blocks in the first line image data signal which is directly applied to said selector, the counting being reset in response to said reset signal; (e) counting the number of transition points in each of the blocks in the first line image data signal which is applied to said selector via said convolution circuit, the counting being reset in response to said reset signal; (f) detecting which number of the transition points in the same data block of the first line image data signal, counted in steps (d) and (e), is smaller, and issuing comparison results; (g) storing the comparison results of n blocks of the first line image data; and (h) applying the comparison results to said selector which chooses the data blocks of a second line image data signal applied thereto, in accordance with the comparison results, the second line image data signal being preceded by said first line image data signal.

A second aspect of the present invention comes in a method of pre-processing a picture image data signal before run-length encoding, the picture image data signal being obtained by line scanning a document and including black/white image data and halftone image data, comprising the steps of: (a) dividing each line image data signal obtained into n data blocks (n is a positive integer); (b) producing a reset signal in synchronism with each of the data blocks; (c) applying a first line image data signal to a selector via a first predictor and also applying the first line image data signal via a second predictor to said selector; (d) counting the number of transition points in each of the data blocks in the first line image data signal which is applied to said first predictor via the first predictor, the counting being reset in response to said reset signal; (e) counting the number of transition points in each of the blocks in the first line image data signal which is applied to said selector via the second predictor, the counting being reset in response to said reset signal; (f) detecting which number of the transition points in the same data block of the first line image data signal, counted in steps (d) and (e), is smaller, and issuing comparison results; (g) storing the comparison results of n blocks of the first line image data; and (h) applying the comparison results to said selector which chooses one of the data blocks of a second line image data signal applied thereto, in accordance with the comparison results, the second line image data signal being preceded by said first line image data signal.

BRIEF DESCRIPTION OF THE DRAWINGS

The features and advantages of the present invention will become more clearly appreciated from the following description taken in conjunction with the accompanying drawings in which like elements are denoted by like reference numerals and in which.

DETAILED DESCRIPTION OF THE PREFERRED EMBODIMENTS

A first embodiment of the present invention will be discussed with reference to FIGS. 1-4.

Figure 1:
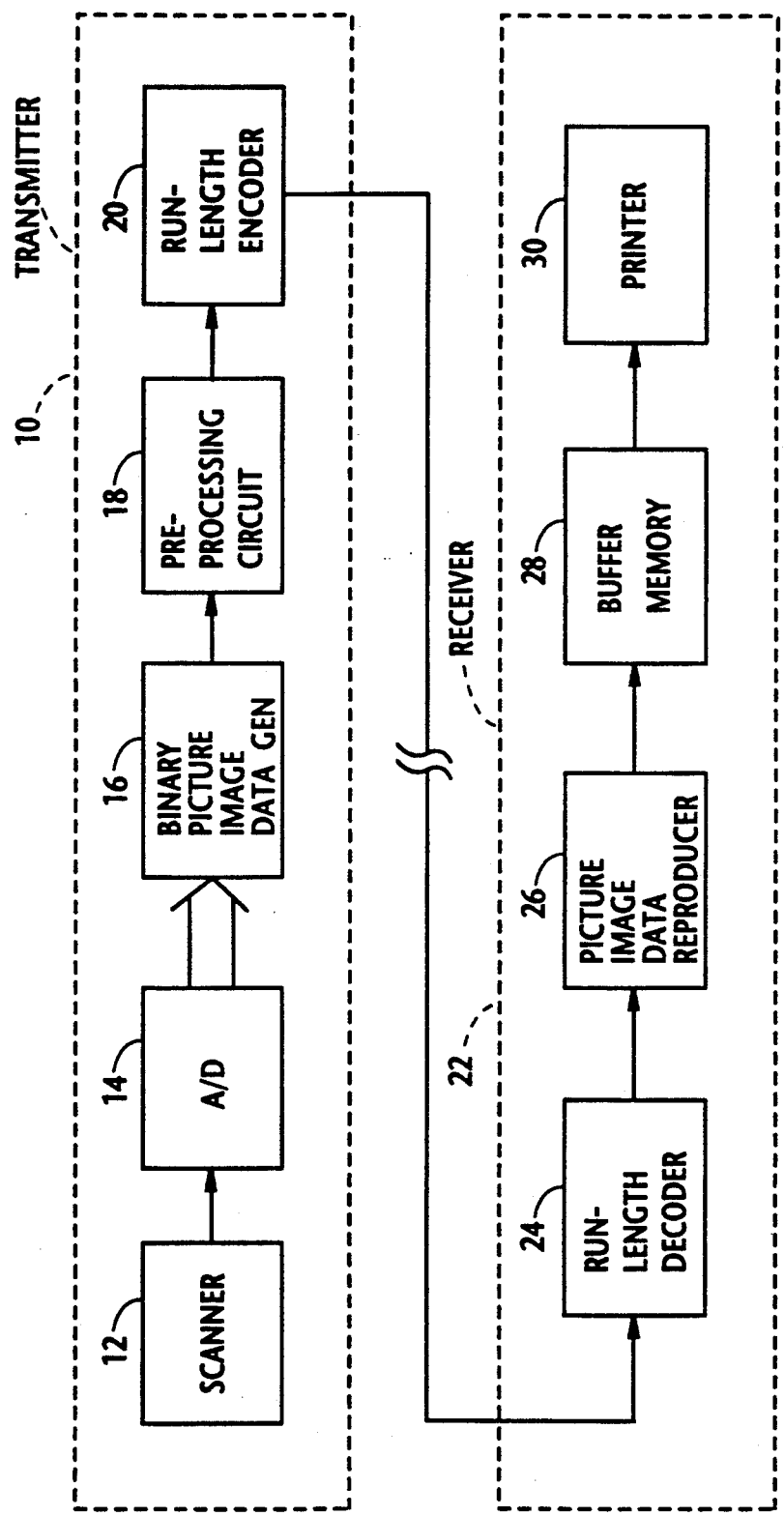
FIG. 1 is a block diagram showing the basic arrangement which underlies the present invention.

FIG. 1 is a block diagram showing schematically an overall arrangement to which the present invention is applied.

In FIG. 1, a document (not shown) which includes black/white and half-tone images is scanned by a scanner 12 provided in a transmitter 10. The output of the scanner 12 (viz., analog picture image data) is converted into corresponding multi-value image data at an analog-to-digital (A/D) converter 14. The output of the A/D converter 14 is applied to a binary picture image data generator 16 which produces a binary picture image data which includes pseudo-halftone and non-halftone binary signals. The data processing at the generator 16 is known in the art and is not directly concerned with the present invention. Hence, further descriptions thereof is deemed unnecessary.

The binary image data outputted from the image data generator 16 is applied to a pre-processing circuit 18 to which the instant invention is applied. The pre-processing circuit 18 will be discussed in detail with reference to FIG. 2. A sequence of binary data consisting of "1" and "0" values are then transmitted to the receiver after being run-length encoded at an encoder 20.

The receiver 22 is supplied, at a run-length decoder 24, the run-length encoded binary data relayed from the transmitter 10. The decoded binary data is then applied to a picture image data reproducer 26 which is directly concerned with the instant invention and will be discussed in detail with reference to FIG. 3. A buffer memory 28, which is preceded by the above-mentioned data reproducer 26, is arranged to store the output thereof. The original binary data memorized in the buffer memory 28 is then outputted to a printer 30.

Figure 2:
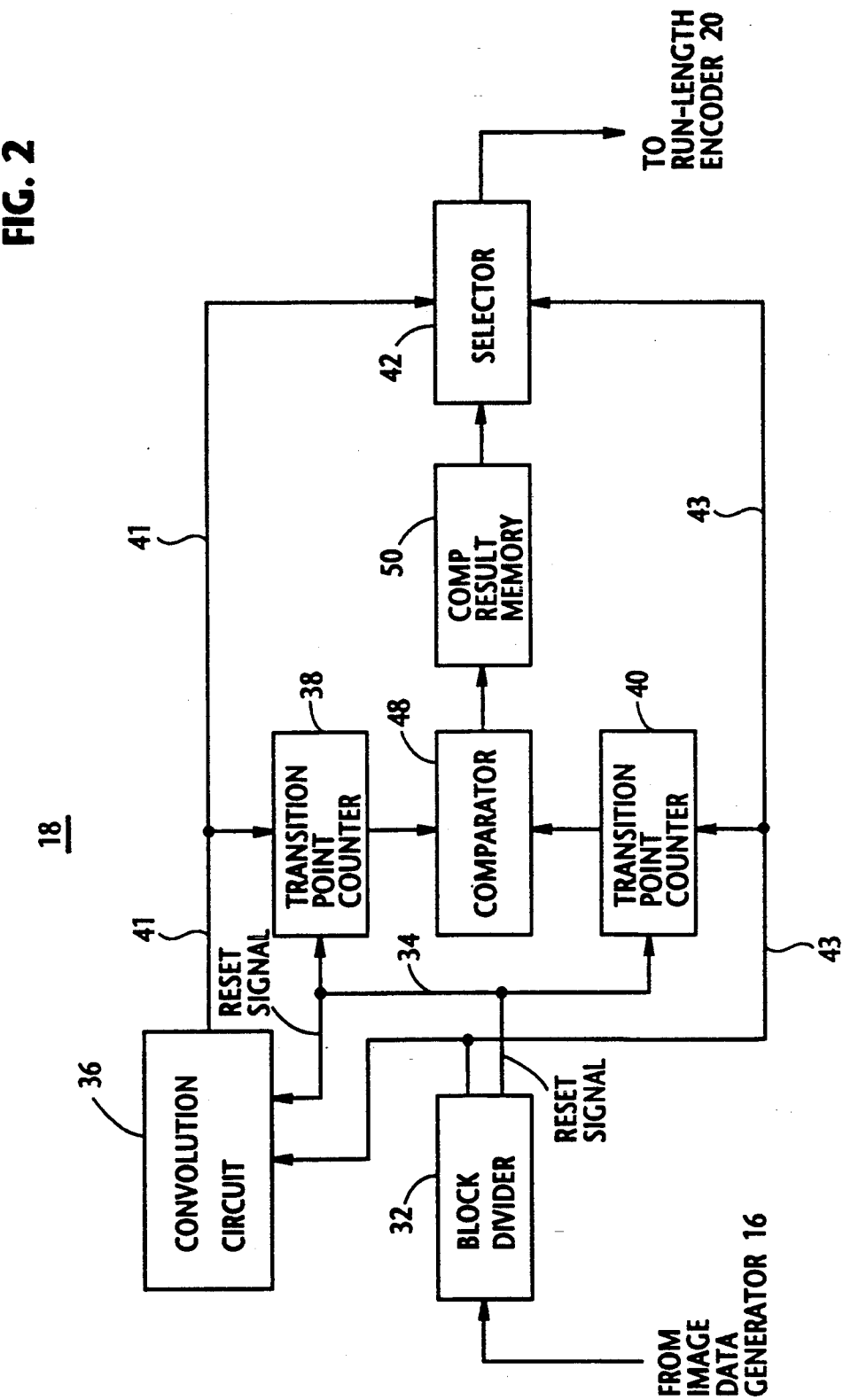
FIG. 2 is a block diagram showing details of the pre-processing circuit shown in FIG. 1.

FIG. 2 is a block diagram showing in detail the arrangement of the pre-processing circuit 18 of FIG. 1.

The binary picture data outputted from the image data generator 16 (FIG. 1) is applied to a block divider 32 wherein each of line data is virtually divided into n blocks (n is a positive integer). In more specific terms, the block divider 32 is arranged merely to issue a reset signal 34 at a predetermined number of machine clocks after the end of each block. This is because "virtual division" is used in the above. The reset signal 34 is applied to a convolution circuit 36, and two transition point counters 38, 40. The binary picture data from the image data producer 16 is allowed to be applied, without being subject to any data processing at the block divider 32, to the convolution circuit 36, the transition point counter 40 and a selector 42.

Figure 4:
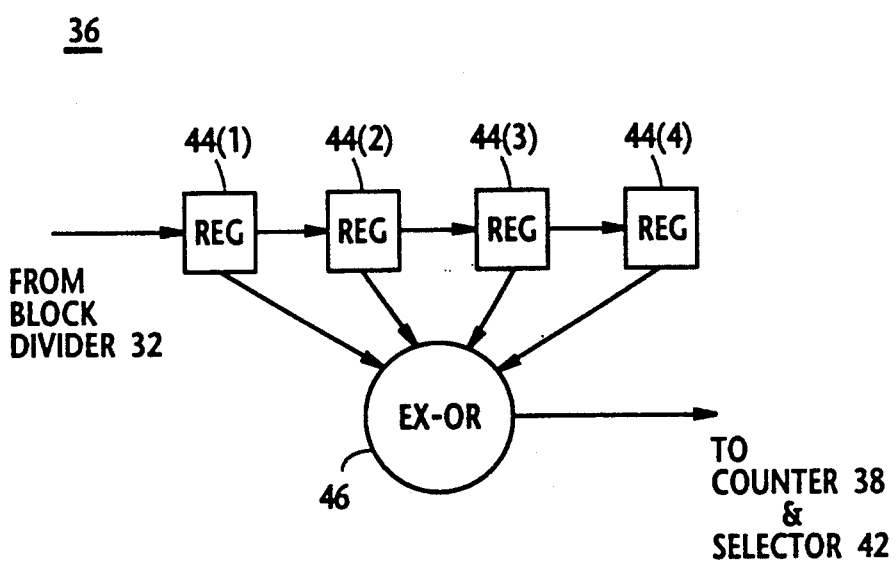
FIG. 4 illustrates the conceptual arrangement of the convolution circuit shown in FIG. 2.

The arrangement of the convolution circuit 36 is shown in FIG. 4 which includes four registers 44(1)-44(4) and an exclusive-OR gate 46 by way of example. This means that the binary data applied to the counter 38 from the exclusive-OR gate 46 is delayed by four clocks as compared with the binary data inputted to the counter 40. Accordingly, the above mentioned predetermined number of machine clocks equals four(4) in this particular case.

Each of the transition point counters 38, 40 counts up the number of transition points (viz., from "1" to "0" and vice versa) of each block of one line. Each of the counters 38, 40 outputs the content thereof to a comparator 48 in response to the reset signal 34 and clears same within the same clock interval. The comparator 48 compares the number of transition points of each of the "n" blocks of each line applied from the two counters 38, 40. The comparator 48 sequentially outputs the comparison results of one-line blocks to a comparator result memory 50.

The transition points of each block of the next line is also counted up at the two counters 38, 40 in the same manner as mentioned above. The selector 42 is responsive to the transition point data of the preceding line stored in the memory 42 and, selects one of the two block data of the above mentioned next line applied from the convolution circuit 36 and the block divider 32. In more specific terms, in the event that the comparator 48 detects the number of the transition points of a given block (preceding line) which has been applied from the counter 38, the selector 42 selects the corresponding binary data block (next line) applied from the convolution circuit 36, and vice versa. This is based on the assumption that two blocks positioned at the same location on the adjacent two lines exhibit a high correlation.

In brief, the selector 42 is arranged to select one of the two binary data blocks of a current line applied via two lines 41, 43 according to the transition point data of the corresponding block of the previous line. In other words, if the number of transition points of a given block of the previous line over the line 41 was smaller than that over the line 43, then the selector 42 selects the corresponding binary block of the current line via the line 41, and vice versa.

In order to deal with the first line data, the memory 50 prestores initial transition point data of the "n" blocks such that the selector 42 selects all the binary data blocks of the first line applied via the line 43 (for example).

Figure 3:
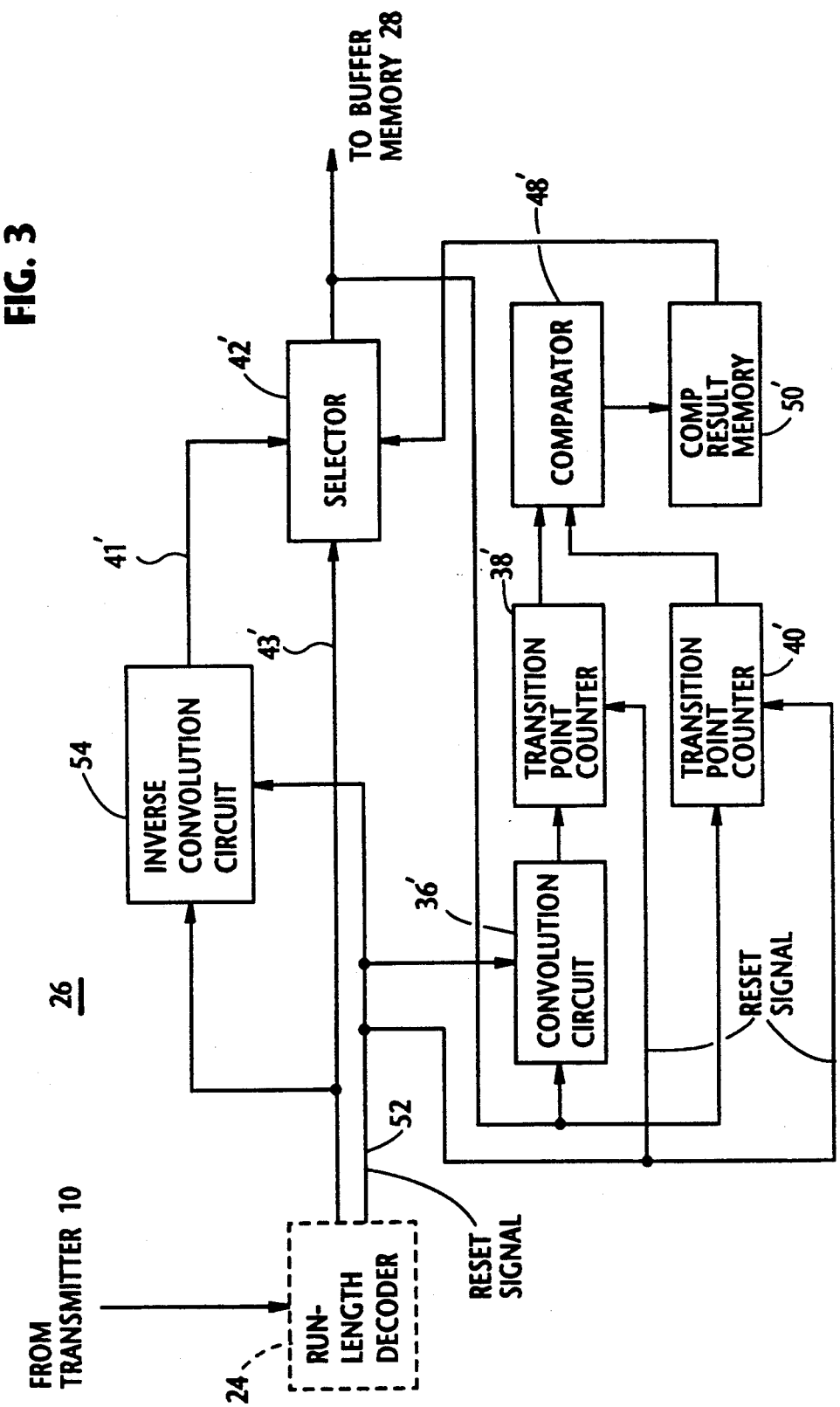
FIG. 3 is a block diagram showing details of the picture image data reproducer shown in FIG. 1.

FIG. 3 is a block diagram showing in detail the arrangement of the picture image data reproducer 26 (FIG. 1) together with the preceding block, viz., run-length decoder 24 (FIG. 1).

The run-length decoder 24 issues a reset signal 52 after four clocks from each of the blocks of one line, in a manner similar to that described previously. The reset signal 52 is applied to a convolution circuit 36', two transition point counters 38', 40' and an inverse convolution circuit 54.

The blocks labelled reference number with prime (36', 38', 40', 42', 48' and 50') correspond respectively to the blocks having corresponding numbers in FIG. 2 in that they implement the operations substantially identical with the corresponding blocks of FIG. 1. As in the above mentioned case, the comparator result memory 50' initially stores the data which are identical with those initially stored in the corresponding memory 50. Accordingly, the original first line can be reproduced.

Figure 5:
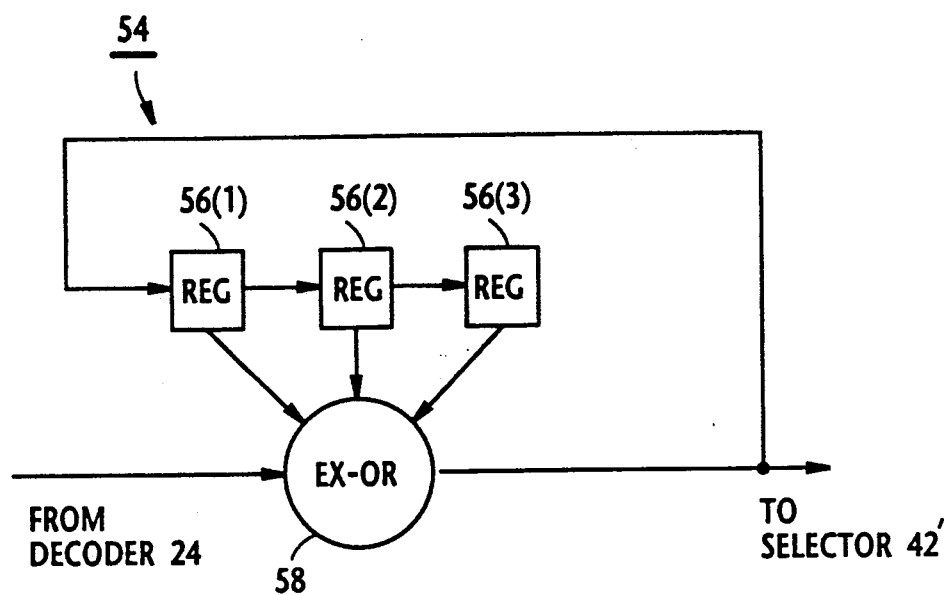
FIG. 5 illustrates the conceptual arrangement of the inverse convolution circuit shown in FIG. 54.

An example of the inverse convolution circuit 54 is shown in FIG. 5. In this particular case the circuit includes, three registers 56(1)–56(3) and an exclusive-OR gate 58.

It is understood that the run-length encoded binary data which is transmitted from the transmitter 10, can be faithfully reproduced by the arrangement shown in FIG. 3.

A second embodiment of the present invention will be discussed with reference to FIGS. 1 and 6–7.

Figure 6:
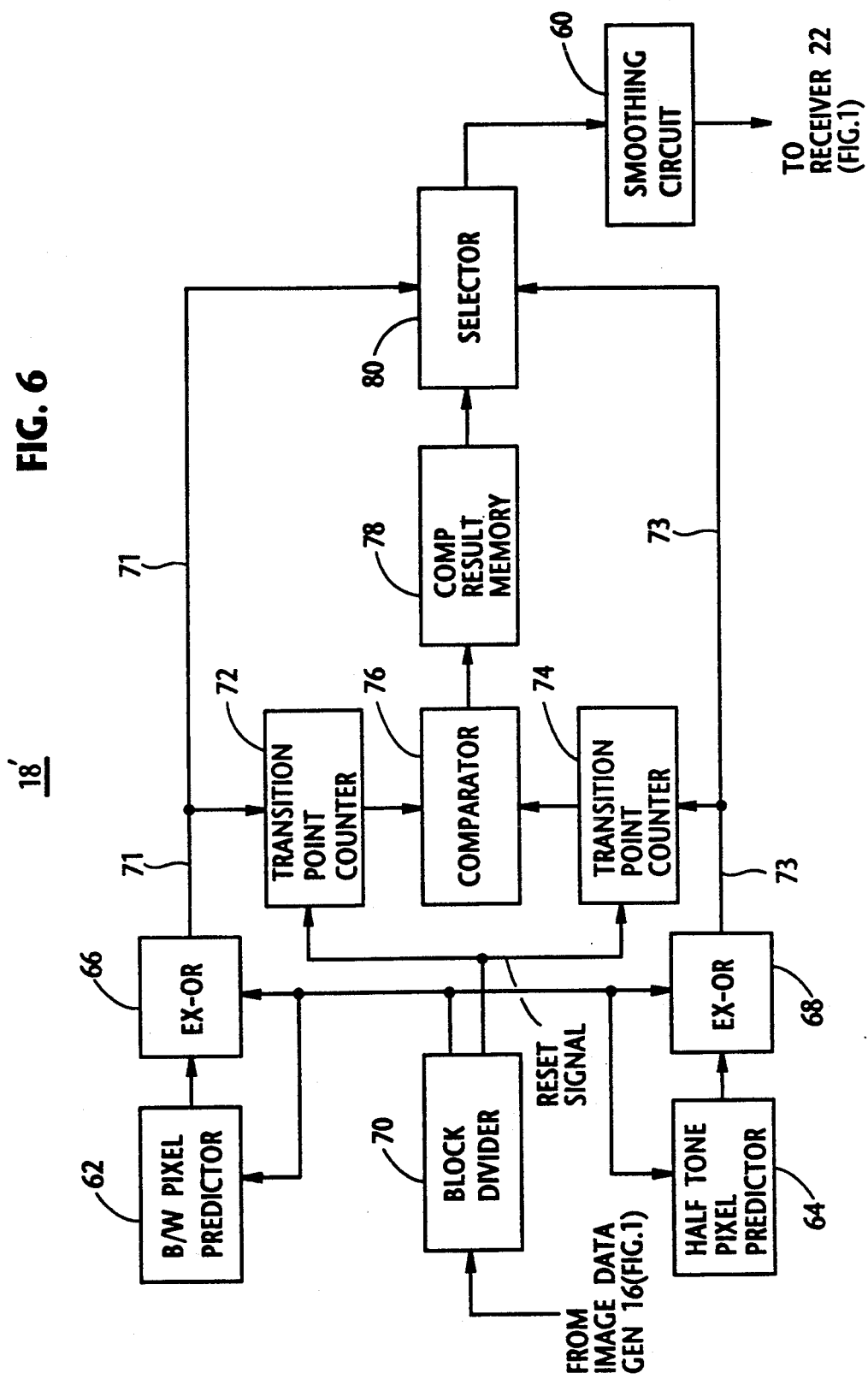
FIG. 6 is a block diagram showing details of a pre-processing circuit according to a second embodiment of the present invention.

FIG. 6 shows an arrangement which illustrates in detail another embodiment of the pre-processing circuit 18 of FIG. 1 and which therefore corresponds to the FIG. 3 arrangement. On the other hand, FIG. 7 shows an arrangement which illustrates the picture image data reproducer of FIG. 1 and accordingly corresponds to the arrangement of FIG. 4. The FIG. 6 arrangement further includes a smoothing circuit 60.

The arrangement of FIG. 6 (except for the smoothing circuit 60) differs from that of FIG. 3 in that the former arrangement includes a black/white (B/W) pixel predictor 62, a halftone pixel predictor 64 and two exclusive-OR gates 66, 68 in place of the convolution circuit 36 of FIG. 2. Both of the predictors 62, 64 themselves are known in the art. Viz., the B/W pixel predictor 62 predicts each of pixels by referring to a predetermined number of the preceding pixels by way of example. On the other hand, the halftone pixel predictor 64 predicts a given pixel on the basis of a predetermined number of the preceding pixels each of which changes at a period of four pixels in the case where a 4X4 dither matrix is employed in the binary picture image data generator 16 (FIG. 1).

As shown in FIG. 6, there are provided blocks 70, 72, 74, 76, 78 and 80 which respectively correspond to the blocks 32, 38, 40, 48, 50 and 42 of FIG. 2 and whose functions are identical with their counterparts. According, further descriptions thereof will be omitted for brevity.

Prediction error signals outputted from the predictors 62, 64 are respectively applied to the exclusive-OR gates 66, 68 each output of which indicates if the prediction at the corresponding predictor 62 (or 64) is correct. The outputs of the exclusive-OR gates 66, 68 are respectively supplied to the counters 72, 74 and also to the selector 80 via lines 71, 73. The block divider 70 issues a reset signal at the end of each blocks of a given line. In this embodiment, the reset signal needs not to be delayed as in the first embodiment in that there exists no clock delay between the outputs of the exclusive-OR gates 66, 68. The output of the selector 80 is transmitted to the receiver 22 after being smoothed at the smoothing circuit 60 as is known in the art. That is, each time when the smoothing circuit 60 finds a prediction error bit (logic "1" for example) in the prediction error signal applied thereto, the circuit 60 reverses each of bits outputted therefrom to "1" or "0" until detecting the next prediction error bit.

Figure 7:
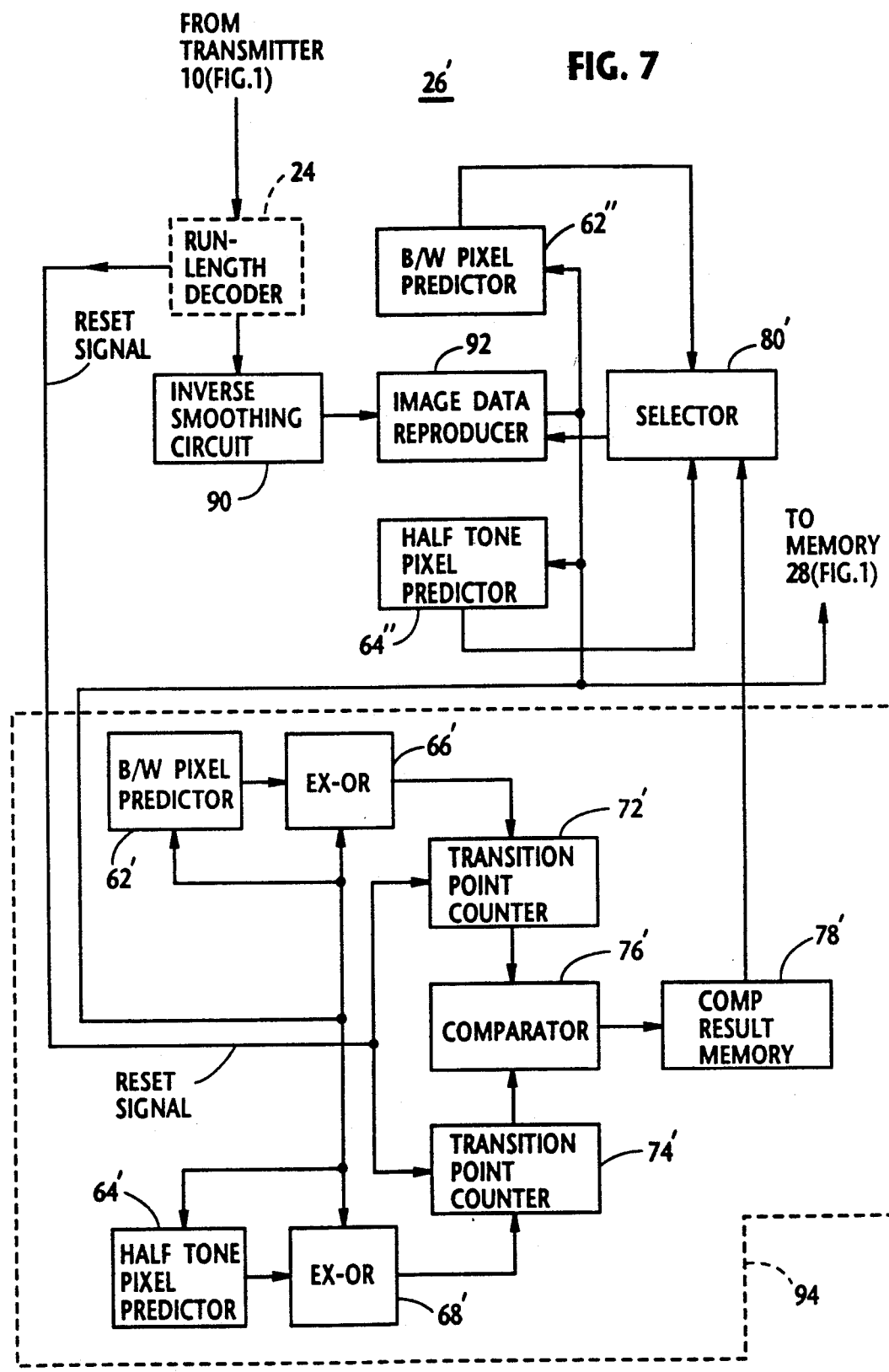
FIG. 7 is a block diagram showing details of a picture image data reproducer according to a second embodiment of the present invention.

FIG. 7 shows the arrangement, denoted by numeral 28', which corresponds to the FIG. 3 arrangement as mentioned above.

A circuit section 94, enclosed by a broken line, implements an operation which is similar to that carried out by the circuitry specified by the blocks 36', 38', 40', 48' and 50' of FIG. 3. The circuit section 94 includes blocks 62'–78' which respectively correspond to the block 62–78 shown in FIG. 6 and functions essentially in the same manner as in FIG. 3 in order to reproduce the original data transmitted from the receiver 10. In FIG. 7, the block 24 enclosed by broken line does not belong to the picture image data reproducer 26 (FIG. 1).

The output of the inverse smoothing circuit 90 is applied to a transmitted data reproducer 92 which reproduces the image data from the circuit 90 and applies the reproduced data to the buffer memory 28 (FIG. 1) and also to the counters 72', 74' of the circuit section 94 for use in reproduction of the next scanned line. The comparison result memory 78' outputs a selector signal to the selector 80' to instruct same which prediction implemented by predictors 62", 64" should be used to reproduce each of the blocks of the next line. Thus, the binary image data transmitted from the transmitter 10 can be exactly reproduced at the FIG. 7 arrangement denoted by numeral 28'.

While the foregoing description described two preferred embodiments according to the present invention, the various alternatives and modifications possible without departing from the scope of the present invention, which is limited only by the appended claims, will be apparent to those skilled in the art.

What is claimed is:

1. A method of pre-processing a picture image data signal before run-length encoding, the picture image data signal being obtained by line scanning a document and including black/white image data and halftone image data, comprising the steps of:
   (a) dividing each line image data signal obtained into n data blocks (n is a positive integer);
   (b) producing a reset signal in synchronism with each of the data blocks;
   (c) applying a first line image data signal to a selector and also applying the first line image data signal via a convolution circuit to said selector;
   (d) counting the number of transition points in each of the data blocks in the first line image data signal which is directly applied to said selector, the counting being reset in response to said reset signal;
   (e) counting the number of transition points in each of the blocks in the first line image data signal which is applied to said selector via said convolution circuit, the counting being reset in response to said reset signal;
   (f) detecting which number of the transition points in the same data block of the first line image data signal, counted in steps (d) and (e), is smaller, and issuing comparison results;
   (g) storing the comparison results of n blocks of the first line image data; and
   (h) applying the comparison results to said selector which chooses the data blocks of a second line image data signal applied thereto, in accordance with the comparison results, the second line image data signal being preceded by said first line image data signal.

2. A method of pre-processing a picture image data signal before run-length encoding, the picture image data signal being obtained by line scanning a document and including black/white image data and halftone image data, comprising the steps of:

(a) dividing each line image data signal obtained into n data blocks (n is a positive integer);

(b) producing a reset signal in synchronism with each of the data blocks;

(c) applying a first line image data signal to a selector via a first predictor and also applying the first line image data signal via a second predictor to said selector;

(d) counting the number of transition points in each of the data blocks in the first line image data signal which is applied to said first predictor via the first predictor, the counting being reset in response to said reset signal;

(e) counting the number of transition points in each of the blocks in the first line image data signal which is applied to said selector via the second predictor, the counting being reset in response to said reset signal;

(f) detecting which number of the transition points in the same data block of the first line image data signal, counted in steps (d) and (e), is smaller, and issuing comparison results;

(g) storing the comparison results of n blocks of the first line image data; and (h) applying the comparison results to said selector which chooses one of the data blocks of a second line image data signal applied thereto, in accordance with the comparison results, the second line image data signal being preceded by said first line image data signal.

3. A method as claimed in claim 2, wherein said first predictor is a black/white pixel predictor and said second predictor is a halftone pixel predictor.

4. An arrangement for pre-processing a picture image data signal before run-length encoding, the picture image data signal being obtained by line scanning a document and including black/white image data and halftone image data, comprising:

first means for dividing each line image data signal obtained into n data blocks (n is a positive integer);

second means for producing a reset signal in synchronism with each of the data blocks;

third means for applying a first line image data signal to a selector and also applying the first line image data signal via a convolution circuit to said selector;

fourth means for counting the number of transition points in each of the data blocks in the first line image data signal which is directly applied to said selector, the counting being reset in response to said reset signal;

fifth means for counting the number of transition points in each of the blocks in the first line image data signal which is applied to said selector via said convolution circuit, the counting being reset in response to said reset signal;

sixth means for detecting which number of the transition points in the same data block of the first line image data signal, counted by said fourth and fifth means, is smaller, and issuing comparison results;

seventh means for storing the comparison results of n blocks of the first line image data; and eighth means for applying the comparison results to said selector which chooses the data blocks of a second line image data signal applied thereto, in accordance with the comparison results, the second line image data signal being preceded by said first line image data signal.

5. An arrangement for pre-processing a picture image data signal before run-length encoding, the picture image data signal being obtained by line scanning a document and including black/white image data and halftone image data, comprising:

first means for dividing each line image data signal obtained into n data blocks (n is a positive integer);

second means for producing a reset signal in synchronism with each of the data blocks;

third means for applying a first line image data signal to a selector via a first predictor and also applying the first line image data signal via a second predictor to said selector;

fourth means for counting the number of transition points in each of the data blocks in the first line image data signal which is applied to said first predictor via the first predictor, the counting being reset in response to said reset signal;

fifth means for counting the number of transition points in each of the blocks in the first line image data signal which is applied to said selector via the second predictor, the counting being reset in response to said reset signal;

sixth means for detecting which number of the transition points in the same data block of the first line image data signal, counted by said fourth and fifth means, is smaller, and issuing comparison results;

seventh means for storing the comparison results of n blocks of the first line image data; and eighth means for applying the comparison results to said selector which chooses one of the data blocks of a second line image data signal applied thereto, in accordance with the comparison results, the second line image data signal being preceded by said first line image data signal.

* * * * *